(12) United States Patent
Jin et al.

(10) Patent No.: US 12,505,168 B2
(45) Date of Patent: Dec. 23, 2025

(54) ELECTRONIC APPARATUS EXECUTING AUTO-CRAWLING BASED ON ARTIFICIAL INTELLIGENCE AND ELECTRONIC APPARATUS PROVIDING NUTRITION INFORMATION

(71) Applicant: doinglab Corp., Seoul (KR)

(72) Inventors: Song Baik Jin, Seoul (KR); Hyun Suk Lee, Hwaseong-si (KR); Chae Yoon Han, Seoul (KR)

(73) Assignee: doinglab Corp., Seoul (KR)

(*) Notice: Subject to any disclaimer, the term of this patent is extended or adjusted under 35 U.S.C. 154(b) by 39 days.

(21) Appl. No.: 18/464,464

(22) Filed: Sep. 11, 2023

(65) Prior Publication Data

US 2024/0220551 A1 Jul. 4, 2024

(30) Foreign Application Priority Data

Jan. 3, 2023 (KR) .................. 10-2023-0000527
Apr. 7, 2023 (KR) .................. 10-2023-0045783

(51) Int. Cl.
*G06F 16/55* (2019.01)
*G06F 16/951* (2019.01)

(52) U.S. Cl.
CPC ............ *G06F 16/951* (2019.01); *G06F 16/55* (2019.01)

(58) Field of Classification Search
CPC .................. G06F 16/951; G06F 16/55
See application file for complete search history.

(56) References Cited

U.S. PATENT DOCUMENTS

| 2016/0063692 A1* | 3/2016 | Divakaran | ............. | G06V 10/50 382/110 |
| 2016/0063734 A1* | 3/2016 | Divakaran | ............. | G06V 10/50 382/110 |

(Continued)

FOREIGN PATENT DOCUMENTS

| CN | 115017359 A | * | 9/2022 | |
| CN | 111538861 B | * | 8/2023 | ......... G06F 16/7328 |

(Continued)

OTHER PUBLICATIONS

"Notice of Preliminary Examination Result" issued in KR 10-2023-0045783; mailed by the Korean Intellectual Property Office on May 9, 2023.

(Continued)

*Primary Examiner* — Loan T Nguyen
(74) *Attorney, Agent, or Firm* — Studebaker Brackett PLLC

(57) ABSTRACT

The present disclosure relates to an electronic apparatus executing auto-crawling based on artificial intelligence, including: a crawling unit acquiring images including a target using an artificial intelligence model; a target identifying unit identifying a target matching the acquired image; and a processor controlling operations of the crawling unit and the target identifying unit. The processor classifies and searches for images including the target, among images stored in a predetermined area, according to crawling levels, and performs vision processing of the automatically searched images including the target to identify the target, and transmits the target and information on the target to a server or stores the target and information on the target in a memory.

6 Claims, 5 Drawing Sheets

(56) References Cited

U.S. PATENT DOCUMENTS

2020/0066278 A1* 2/2020 Steelberg ............... G06N 3/045
2023/0222821 A1* 7/2023 Delp, III ............. G06F 18/2414
382/110

FOREIGN PATENT DOCUMENTS

| KR | 10-2009-0110074 A | 10/2009 |
| KR | 10-2020-0066278 A | 6/2020 |
| KR | 10-2022-0052046 A | 4/2022 |
| KR | 10-2473282 B1 | 12/2022 |

OTHER PUBLICATIONS

"Written Decision on Registration" issued in KR 10-2023-0045783; mailed by the Korean Intellectual Property Office on Jun. 26, 2023.

* cited by examiner

ELECTRONIC APPARATUS EXECUTING AUTO-CRAWLING BASED ON ARTIFICIAL INTELLIGENCE AND ELECTRONIC APPARATUS PROVIDING NUTRITION INFORMATION

CROSS-REFERENCE TO RELATED APPLICATION

A claim for priority under 35 U.S.C. § 119 is made to Korean Patent Application Nos. 10-2023-0000527 filed on Jan. 3, 2023 and 10-2023-0045783 filed on Apr. 7, 2023 in the Korean Intellectual Property Office, the entire contents of which are hereby incorporated by reference.

BACKGROUND

1. Technical Field

The present disclosure relates to an electronic apparatus executing auto-crawling and an electronic apparatus providing nutrition information, and more specifically, to an electronic apparatus executing auto-crawling based on artificial intelligence and an electronic apparatus providing nutrition information using a graph.

2. Description of Related Art

Since COVID-19, many people have become interested in health, and particularly, have been interested in food, especially, the calorie contents of food due to living mainly with indoor activities.

However, current mobile services require users to manually search and input food names in text or to analyze food pictures directly captured in real-time with a camera to utilize the data. Additionally, the current methods simply display basic nutritional information such as calories, and amounts of the three major nutrients, carbohydrates, protein, and fats.

Conventional patent literature disclosures provide a list of food results when a user accesses a website which provides food calorie information and searches for a specific food. Accordingly, if the user does not individually select or search for desired objects, the user cannot obtain information on the relevant calories. Moreover, since the conventional patent literature merely lists nutritional information such as carbohydrates, protein, and fats in a row, it is actually difficult to utilize the information for food management.

It may be possible to analyze the nutritional content of food using pictures stored in a gallery. However, such a method causes inconvenience in use, since the user has to select the pictures one by one or directly search for food. Additionally, when the user wants to analyze food of a picture which is not stored in the gallery, there is no method to manage the food of the picture/.

PATENT LITERATURE

Patent Documents

Patent Document 1: Korean Patent Publication No. 10-2009-0110074

SUMMARY

The present disclosure has been made to solve the above-mentioned problems occurring in the prior art, and in an aspect of the present disclosure, an object of the present disclosure is to provide an electronic apparatus executing auto-crawling based on artificial intelligence and an electronic apparatus providing nutrition information, which can display various kinds of nutrition information necessary to a user by searching and inputting pre-stored images simultaneously.

The aspects of the present disclosure are not limited to those mentioned above, and other aspects not mentioned herein will be clearly understood by those skilled in the art from the following description.

To accomplish the above-mentioned objects, according to an aspect of the present disclosure, there is provided an electronic apparatus executing auto-crawling based on artificial intelligence, including: a crawling unit acquiring images including a target using an artificial intelligence model; a target identifying unit identifying a target matching the acquired image; and a processor controlling operations of the crawling unit and the target identifying unit. The processor classifies and searches for images including the target, among images stored in a predetermined area, according to crawling levels, and performs vision processing of the automatically searched images including the target to identify the target, and transmits the target and information on the target to a server or stores the target and information on the target in a memory.

Additionally, according to another aspect of the present disclosure, there is provided an electronic apparatus executing auto-crawling based on artificial intelligence, including: a crawling unit searching for and acquiring images including food; a target identifying unit identifying the food matching the acquired image; and a display unit displaying intake calories calculated according to the type and quantity of the identified food and received consumption calories in parallel in a ring-shaped graph. The display unit displays a ring-shaped graph with lengths corresponding to values of the received consumption calories and the intake calories, and additionally displays a parameter with a greater value between the consumption calories and the intake calories, and a difference value of a difference between the consumption calories and the intake calories.

Besides the above, a computer program stored in a computer-readable recording medium for implementing the present disclosure.

DETAILED DESCRIPTION

Figure 1:
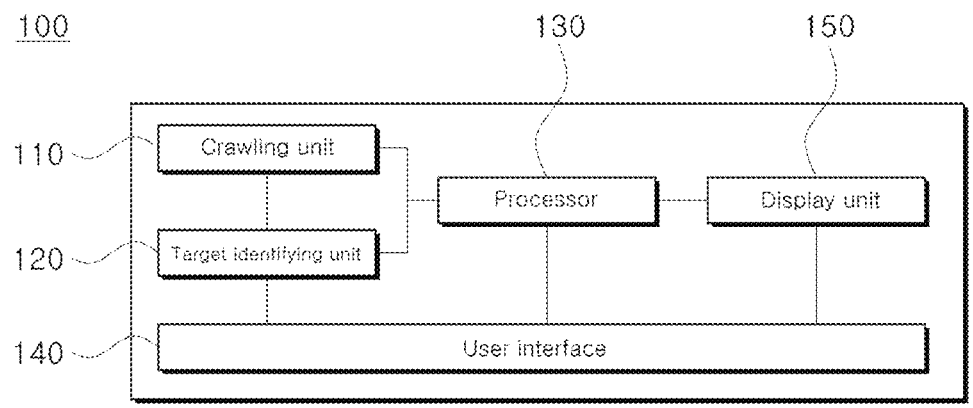
FIG. 1 is a block diagram of an electronic apparatus according to an embodiment of the present disclosure.

In the drawings, like reference numerals designate like components. This disclosure does not describe all components of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one component, or a unit, a module, a member, or a block may include a plurality of components.

Throughout this specification, when a part is referred to as being "connected" to another part, this includes "direct connection" and "indirect connection", and the indirect connection may include connection via a wireless communication network. Furthermore, when a certain part "includes" a certain component, other components are not excluded unless explicitly described otherwise, and other components may in fact be included.

Furthermore, when a certain part "includes" a certain component, other components are not excluded unless explicitly described otherwise, and other components may in fact be included.

In the entire specification of the present disclosure, when any member is located "on" another member, this includes a case in which still another member is present between both members as well as a case in which one member is in contact with another member.

The terms "first," "second," and the like are just to distinguish a component from any other component, and components are not limited by the terms.

The singular form of the components may be understood into the plural form unless otherwise specifically stated in the context.

Identification codes in each operation are used not for describing the order of the operations but for convenience of description, and the operations may be implemented differently from the order described unless there is a specific order explicitly described in the context.

Hereinafter, operation principles and embodiments of the present disclosure will be described with reference to the accompanying drawings.

In description of the present disclosure, an 'apparatus according to the present disclosure' includes all of various apparatuses capable of executing operational management and providing the operational management results to a user. For instance, the apparatus according to the present disclosure may include all of a computer, a server device, and a portable terminal, or may be configured to have any form of the computer, the server device, and the portable terminal.

Here, the computer may include, for example, a notebook computer equipped with a web browser, a desktop, a laptop, a tablet PC, a slate PC, and the like.

The server device is a server to process information by performing communication with an external device, and may include an application server, a computing server, a database server, a file server, a game server, a mail server, a proxy server, a web server, and the like.

The portable terminal is a wireless communication device providing portability and mobility, and includes all kinds of handheld-based wireless communication devices, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (WiBro), a smartphone, and the like, and a wearable device, such as a watch, a ring, a bracelet, an ankle bracelet, a necklace, glasses, contact lenses, or a Head-Mounted Device (HMD).

Functions related to artificial intelligence according to the present disclosure are operated through a processor and a memory. In this instance, one or multiple processors may be general processors such as CPUs, APs, digital signal processors (DSPs) and the like, graphics-specific processors such as GPUs, and vision processing units (VPU), or artificial intelligence-specific processors such as NPUs. The one or multiple processors perform controlling to process input data according to a predefined operational rule or artificial intelligence model pre-stored in the memory. Alternatively, in a case in which the one or multiple processors are artificial intelligence-specific processors, the artificial intelligence-specific processors may be designed with a hardware structure optimized for processing a specific artificial intelligence model.

It is characterized that the predefined operational rule or the artificial intelligence model is created through learning. Here, being "created through learning" means that a basic artificial intelligence model learns multiple pieces of learning data through a learning algorithm using multiple pieces of learning data to create a predefined operational rule or artificial intelligence model set to execute desired characteristics (or objectives). Such learning may be carried out within a device in which the artificial intelligence according to the present disclosure is executed, may be carried out through a server and/or a system. For instance, the learning algorithm includes supervised learning, unsupervised learning, semi-supervised learning, and reinforcement learning, but is not limited thereto.

The artificial intelligence model may include a plurality of neural network layers. Each of the neural network layers includes a plurality of weight values and carries out neural network operations through the calculation between the operation results of the previous layers and the plurality of weight values. The plurality of weight values of the plurality of neural network layers can be optimized based on the learning results of the artificial intelligence model. For instance, during the learning process, the plurality of weight values can be updated so that loss values or cost values obtained from the artificial intelligence model decrease or are minimized. The artificial neural network may include a Deep Neural Network (DNN). The deep neural network may be, for example, a Convolutional Neural Network (CNN), a Deep Neural Network (DNN), an Recurrent Neural Network (RNN), an Restricted Boltzmann Machine (RBM), a Deep Belief Network (DBN), a Bidirectional Recurrent Deep Neural Network (BRDNN), or deep Q-Networks, but are not limited thereto.

According to an exemplary embodiment of the invention, the processor can implement artificial intelligence. Artificial intelligence refers to a machine learning method based on an artificial neural network which simulates human biological neurons to enable machine learning. Artificial intelligence methodologies can be categorized into supervised learning that provides both input data and output data as training data according to learning methods such that a solution (output data) to a problem (input data) is predetermined, unsupervised learning that provides only input data without output data such that a solution (output data) to a problem (input data) is not predetermined, and reinforcement learning in which rewards are provided from the external environment each time an action is taken in the current state and learning proceeds in a direction to maximize the rewards. Additionally, the artificial intelligence methodologies can also be differentiated based on the architectures, which are structures of the learning model. Widely used deep learning architectures are classified into a Convolutional Neural Network (CNN), a Recurrent Neural Network (RNN), a transformer, and a Generative Adversarial Network (GAN).

The apparatus and the system may include an artificial intelligence model. The artificial intelligence model may be a single artificial intelligence model or may be implemented with multiple artificial intelligence models. The artificial intelligence model may be comprised of a neural network or artificial neural network, and may include a statistical learning algorithm which simulates biological neurons in machine learning and cognitive science. The neural network may mean the entire model with problem-solving ability by artificial neurons (nodes), which forms a network through coupling of synapses, changing the coupling strength of the synapses through learning. Neurons in the neural network may include combinations of weight values or biases. The neural network may include one or more layers having one or more neurons or nodes. For example, the apparatus may include an input layer, a hidden layer, and an output layer. The neural network constituting the apparatus can change the weight values of neurons through learning to infer an output to be predicted from an arbitrary input.

The processor can create a neural network, train or learn the neural network, or perform operation based on received input data, and generate an information signal based on the operation results, or retrain the neural network. Models of the neural network may include various types of models, for instance, a Convolution Neural Network (CNN) such as a GoogleNet, an AlexNet, and a VGG Network, a Region with Convolution Neural Network (R-CNN), a Region Proposal Network (RPN), a Recurrent Neural Network (RNN), a Stacking-based deep Neural Network (S-DNN), a State-Space Dynamic Neural Network (S-SDNN), a deconvolution network, a Deep Belief Network (DBN), a Restricted Boltzman Machine (RBM), a fully convolutional network, a Long Short-Term Memory (LSTM) network, a classification network, and the like, but are not limited thereto. The processor may include one or more processors to execute operations according to the models of the neural network. For example, the neural network may include the deep neural network.

The neural network may include a Convolutional Neural Network (CNN), a Recurrent Neural Network (RNN), a perceptron, a multilayer perceptron, a Feed Forward (FF), a Radial Basis Function Network (RBFN), a Deep Feed Forward (DFF), a Long Short Term Memory (LSTM), a Gated Recurrent Unit (GRU), an Auto Encoder (AE), a Variational Auto Encoder (VAE), a Denoising Auto Encoder (DAE), a Sparse Auto Encoder (SAE), a Markov Chain (MC), a Hopfield Network (HN), a Boltzmann Machine (BM), a Restricted Boltzmann Machine (RBM), a Deep Belief Network (DBN), a Deep Convolutional Network (DCN), a Deconvolutional Network (DN), a Deep Convolutional Inverse Graphics Network (DCIGN), a Generative Adversarial Network (GAN), a Liquid State Machine (LSM), an Extreme Learning Machine (ELM), an Echo State Network (ESN), a Deep Residual Network (DRN), a Differentiable Neural Computer (DNC), a Neural Turing Machine (NTM), a Capsule Network (CN), a Kohonen Network (KN), and an Attention Network (AN). However, it will be understood by those skilled in the art that the neural network is not limited thereto and can include any type of neural network.

In accordance with an exemplary embodiment of the present disclosure, the processor can utilize various artificial intelligence structures and algorithms, for example, a Convolution Neural Network (CNN) such as a GoogleNet, an AlexNet, a VGG Network, a Region with Convolution Neural Network (R-CNN), a Region Proposal Network (RPN), a Recurrent Neural Network (RNN), a Stacking-based Deep Neural Network (S-DNN), a State-Space Dynamic Neural Network (S-SDNN), a Deconvolution Network, a Deep Belief Network (DBN), a Restricted Boltzmann Machine (RBM), a fully convolutional network, a Long Short-Term Memory (LSTM) network, a classification network, a generative modeling, an explainable AI, a continual AI, a representation learning, an AI for material design, a BERT for natural language processing, an SP-BERT, an MRC/QA, a text analysis, a dialog system, a GPT-3, a GPT-4, a visual analytics for vision processing, a visual understanding, a video synthesis, a ResNet (Residential Energy Services Network), an anomaly detection for data intelligence, a prediction, a time-series forecasting, an optimization, a recommendation, a data creation and more, but is not limited thereto. Hereinafter, embodiments of the present disclosure will be described in detail with reference to the accompanying drawings.

FIG. 1 is a block diagram illustrating an electronic apparatus according to an embodiment of the present disclosure, and the electronic apparatus will be described in detail with reference to FIGS. 2 to 6.

The electronic apparatus 100 according to an embodiment of the present disclosure may include: a crawling unit 110 for acquiring images including a target using an artificial intelligence model; a target identifying unit 120 for identifying a target matching the acquired images; and a processor 130 for controlling the operations of the crawling unit 110 and the target identifying unit 120.

In addition, as illustrated in FIG. 1, the electronic apparatus 100 may further include: a display unit 150 displaying calculated intake calories and received consumption calories in parallel in a graph in accordance with types and amounts of food included in the image; and a user interface 140 to detect user input.

In an embodiment, the processor 130 can classify and search for images including the target according to the crawling level from images stored in a predetermined area and can perform vision processing to the automatically searched images including the target to identify the target.

In an embodiment, the predetermined area may include a memory within the electronic apparatus 100, a cloud server, or a web page. The automatic image search can be carried out not only in the gallery of a user's mobile device or a storage inside a computer but also in a wearable device, a cloud storage, an SNS, another server, and the like.

Furthermore, the crawling unit 110 according to the present disclosure acquires the images including the target using an artificial intelligence model, and can perform the automatic image search using the artificial intelligence model included in the electronic apparatus 100. The food of the automatically searched images and information of the food can be stored in the memory of the electronic apparatus 100.

Alternatively, to perform the automatic search using the artificial intelligence model on a server 300 connected to the electronic apparatus 100, image data can be transmitted to the server 300 through the communication interface of the electronic apparatus 100, and the electronic apparatus 100 can receive the automatically searched images including food or the analysis results of the food from the server 300 and store them in the memory of the electronic apparatus 100.

In this instance, the information of the image may include food information including at least one of the name, the quantity, and nutritional information of the food, and imaging information including at least one of the imaging time and location of the image.

Figure 2:
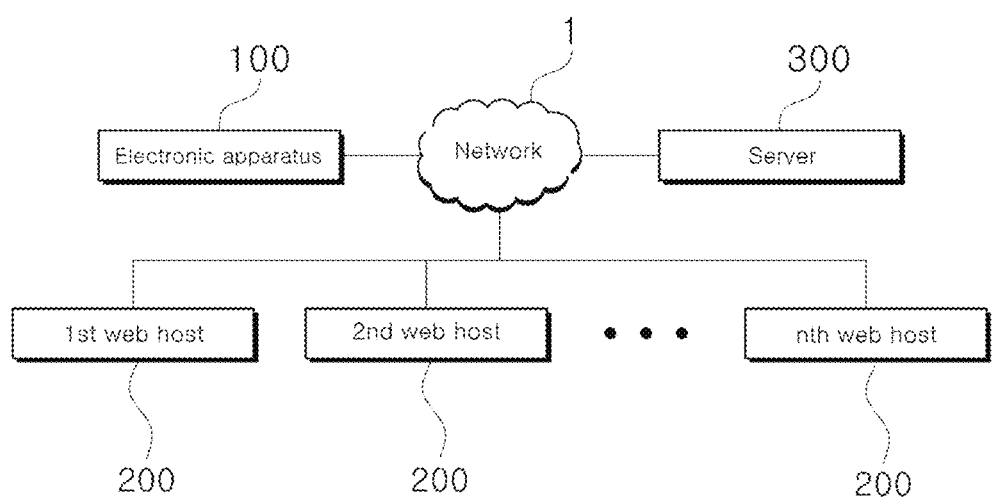
FIG. 2 is a view illustrating an auto-crawling process of the electronic apparatus executing auto-crawling based on artificial intelligence according to an embodiment of the present disclosure.

As illustrated in FIG. 2, the electronic apparatus 100 can be connected to the server 300 via a network 1 to store the food information in a database of the server 300 or to process the image using the artificial intelligence model stored in the server 300.

Furthermore, the electronic apparatus 100 can be connected to a plurality of web hosts 200 to search for images from the web hosts 200. The web hosts 200 may be various types of SNS such as Instagram, Facebook, Twitter, and the like.

In other words, the electronic apparatus 100 according to the present disclosure can automatically search and record images including food, such that the user can automatically record meals and receive evaluations on the meals without cumbersome manual input each time, and can automatically search for and input all foods simultaneously without needing to manually photograph and input food for each meal.

In another embodiment, the electronic apparatus 100 can transmit selected images from the automatically searched images or additional captured images to a server or store them in the memory according to commands received from the user interface 140.

Specifically, the electronic apparatus 100 can provide the images automatically searched through auto-crawling to the user through the user interface 140, and perform food analysis on only the images selected by the user.

Figure 3:
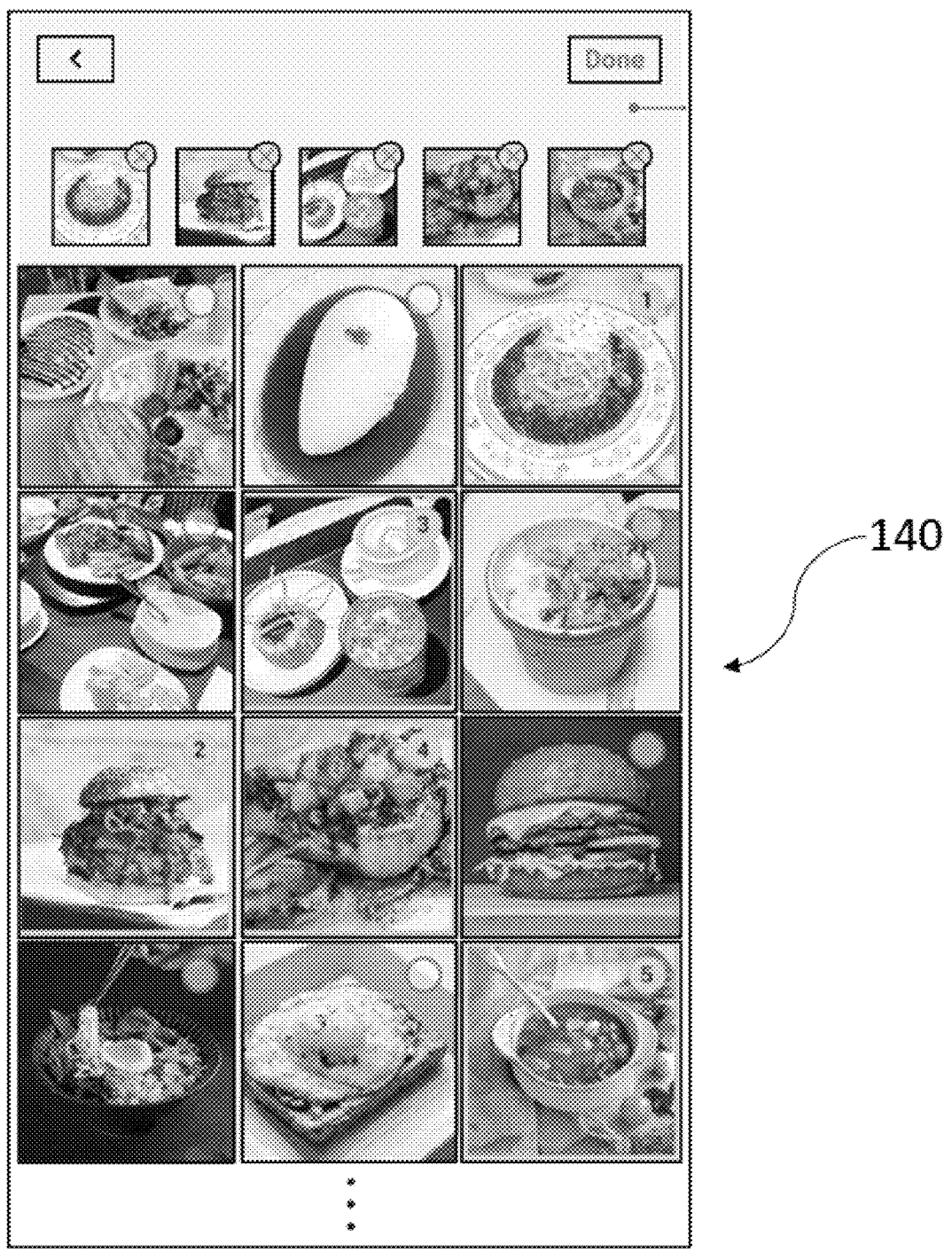
FIG. 3 is a view illustrating a process in which a user selects a portion of food images automatically searched by the electronic apparatus executing auto-crawling based on artificial intelligence according to an embodiment of the present disclosure.

In an embodiment, as illustrated in FIG. 3, when the display unit 150 of the electronic apparatus 100 provides the auto-crawled images including food, the user can select only images that the user wants to perform nutrition analysis through the user interface 140.

Alternatively, the user can select only the images, which the user wants to perform nutrition analysis through the user interface 140, from the images stored in the gallery.

Therefore, the electronic apparatus 100 according to the present disclosure can obtain images including food through a combination of the automatic search by auto-crawling and the manual search for pictures that the user directly imaged or pictures that the user directly selected from the gallery.

Alternatively, in addition to the images automatically searched through auto-crawling, the user can add images that the user selected through the user interface 140 or imaged in real time.

Meanwhile, the processor 130 of the electronic apparatus 100 according to the present disclosure can recognize when new images are added to the predetermined area, input an image auto-search command from the user interface 140, and automatically search for images in the predetermined area according to at least one of predetermined cycles.

In other words, the auto-search function may be performed at specific cycles, or may be performed when recognizing that new images are added in the memory of the electronic apparatus 100 or when the user requests the auto-search.

An automatic search area is the predetermined area, and may be a space capable of storing images, such as a memory (gallery) within a mobile device, a specific folder in a computer, a cloud storage, an SNS, and any other space. The space can collect all images including food.

Moreover, the processor 130 can determine whether food exists in the images and classify the food using artificial intelligence model or the computer vision technology.

The processor 130 can determine whether food exists in the images and classify the food using an image mode artificial intelligence model or the computer vision technology searched depending on the automatic search through auto-crawling by the crawling unit 110 and the manual search through the user interface 140.

The crawling unit 110 according to the present disclosure can search for food by classifying images, and can perform auto-crawling according to crawling levels applicable when classifying the images.

Therefore, the processor 130 according to the present disclosure can control the crawling unit 110 to automatically search for images including the target according to a crawling level determined among a first crawling level searching for images including only the target, a second crawling level searching for images including only the target and images including a portion of the body excluding the target and a person's face, and a third crawling level searching for images including only the target, images including a portion of the body excluding the target and a person's face, and images including the target and a person's face.

For instance, in a case in which a user habitually images only food for recording meals, and images both a friend's face and food at a restaurant for recording an appointment with a friend, the processor 130 can search for only food of the first crawling level by using the artificial intelligence model.

Alternatively, when the user photographs a menu, in a case in which food pictures including the hand of a person in front of the user are included, the processor 130 can automatically search for also food of the second crawling level.

The artificial intelligence model according to an embodiment of the present disclosure can be trained separately for images classified according to each crawling level. The electronic apparatus can determine how far to crawl by the user's selection through the user interface 140 using the trained artificial intelligence model, can set the crawling level, and can classify images including food corresponding to the input crawling level.

Meanwhile, the processor 130 according to the present disclosure classifies the automatically searched images according to time zones, and among images imaged within a time zone of a predetermined range, only one image is transmitted to the server and is stored in the memory, and the remaining images are deleted.

Specifically, during the automatic image search, images on a specific date/time zone can be searched, or images of a user-input time zone can be searched, only images after the last search can be searched, or only images saved at once after the previous search based on previous search history can be searched.

For example, a user who has lunch at 12:00 on weekdays and at 13:00 on weekends can search for images imaged at 12:00 on weekdays and at 13:00 on weekends Alternatively, in a case in which the user sets an input time zone to search for images including food among images input between 11:00 and 13:00, the processor can search for images input between 11:00 and 13:00.

In an embodiment, the food automatically searched according to the method can be stored in the database (DB) of the server or the memory in the electronic apparatus 100 according to the user's input through the user interface 140.

Specifically, the electronic apparatus 100 can provide the user with a list of automatically searched foods via the user interface 140 or the display unit 150, or can inform the user, through the user interface 140, of whether the food input via the user interface 140 is included in the list of the searched foods. In addition, the electronic apparatus 100 can provide additional information on imaging time, and location of the searched food.

The list of the provided foods or information on the searched and confirmed food after the input by the user can be transmitted and stored in the DB or the memory, and the additional information on imaging time, and location of the searched food can be combined and stored.

In an embodiment, with respect to the list of the automatically searched and provided foods, thereafter, when there is an image manually searched by the user input, information about the manually searched image can be stored in the DB of the server or stored in the memory.

Additionally, the electronic apparatus 100 according to the present disclosure can inform the user of that there is food searched after a specific period or after the last input to induce a user input via the user interface 140.

On the other hand, when the automatically searched food is stored automatically in the DB of the server 300 or in the memory of the electronic apparatus 100, the food imaged during the specific time zone is processed as duplication, and only one image can be used.

In other words, time is partitioned into predetermined intervals, and images included in the same time zone are considered as being imaged for the same food. Accordingly, except just one image, all redundant images are deleted to remove duplication.

Moreover, before removing duplicate images, using the artificial intelligence model, the electronic apparatus can confirm whether pictures of the same food are included, and then, remove duplicate images from the images existing in the same time zone.

In an embodiment, the processor 130 according to the present disclosure can prioritize the images to be removed among the plurality of images.

For example, in a case in which the images are input in the order of being stored, the earliest stored image is input and stored, and the remaining images are deleted.

Alternatively, an image including the most food among the images imaged in a predetermined time zone can be input and stored, and the remaining images are deleted.

Furthermore, in a case in which a plurality of images exist within a predetermined time zone, the processor 130 compares the images by using the artificial intelligence model, and does not delete the images when the images include different foods and save the plurality of images. Alternatively, the processor 130 compares the images, and when the types of food included in the images are the same, input and save only one image.

Furthermore, in a case in which a portion of the food included in each image overlaps, the processor can selectively remove the duplication of the overlapped food using the artificial intelligence model, and can input and save only the list of non-overlapping foods.

The list of foods may include additional information recorded on a picture, such as the name of the food, nutritional information of the food, information on imaging location, information on imaging time, and the like.

The processor 130 according to the present disclosure can combine the automatic input function and the user verification function to input the list of foods.

Additionally, the processor can provide results of food that the user previously input through the user interface 140, and when the previously input food is input and saved, can immediately inform the user of the input and saving.

In an embodiment, the processor provides a notification regarding the information of the foods input during a specific time zone simultaneously. For instance, the processor can provide a summary of foods input for a day at nine in the evening.

The user receives the notification or the summary to check the list of foods, so that even if the food included in the image is not input as a meal record, the user's past eating habits can be evaluated by using the foods searched through the automatic search function.

The electronic apparatus 100 of the present disclosure may include a display unit 150 which schematizes and provides information on an identified target. Even if the food information is input, the food information cannot be utilized properly if proper information is not properly shown to the user, and a mere listing of quantified information does not allow for the user to easily understand. Accordingly, the electronic apparatus 100 according to the present disclosure can display various kinds of nutrition information through visualization.

In an embodiment, the target is food, and the display unit 150 can display calculated intake calories and received consumption calories in parallel in a graph in accordance with types and amounts of food included in the image Furthermore, the display unit 150 can display the graph with lengths corresponding to values of the received consumption calories and the intake calories, and additionally display a parameter with a greater value between the consumption calories and the intake calories, and a difference value of a difference between the consumption calories and the intake calories.

Figure 4:
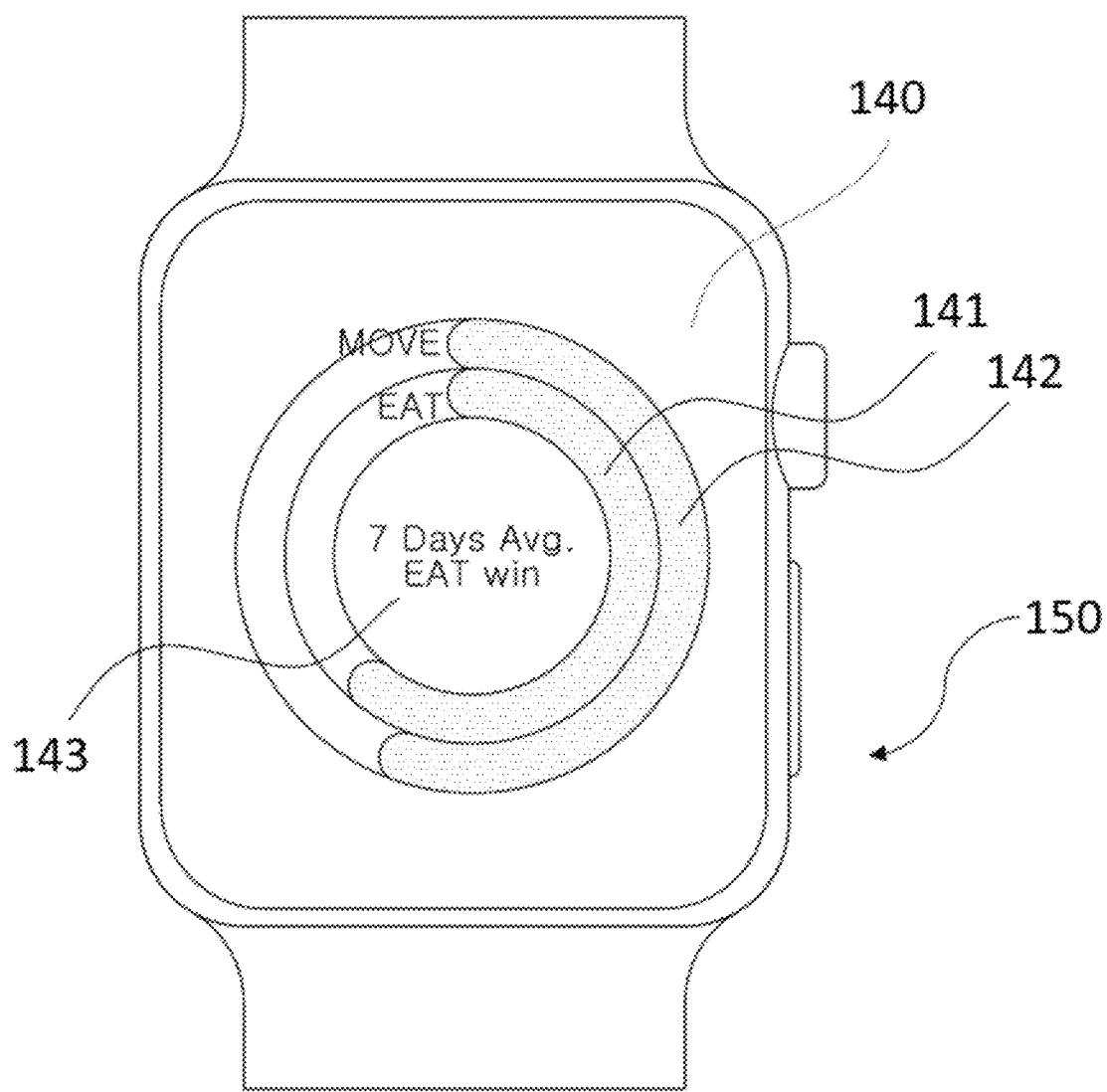
FIG. 4 is a view of a display unit of an electronic apparatus providing nutrition information according to an embodiment of the present disclosure.

As illustrated in FIG. 4, in an embodiment, the intake calories (EAT) can be displayed in a ring-shaped graph 141, and the consumption calories (MOVE) can be displayed in a ring-shaped graph 142.

Additionally, in the center of the graph, the greater value between the intake calories (EAT) and the consumption calories (MOVE) is represented (win) as a text 143. In some embodiments, the final surplus/deficit of calories can be further indicated.

In an embodiment, the intake calories and the consumption calories can be displayed through various visualized markers, for example, can be displayed in various forms of graph, such as a circular graph, a bar graph, and the like. As illustrated in FIG. 4, the intake calories and the consumption calories are displayed in a ring-shaped graph.

Moreover, when displaying the intake calories and the consumption calories in the visualization method, the standards for the intake calories and the consumption calories can be set in various ways.

For instance, when displaying the consumption calories (MOVE), at least one of the basal metabolism, digestive metabolism, and activity metabolism can be displayed, and only a portion of the categories may be used.

The digestive metabolism is calculated as calories consumed for digestion of food that the user ate for intake of nutrients, and can be calculated by using the type and quantity of food and individual information of the user. The activity metabolism is momentum data, and can be measured by using a sensor of the electronic apparatus 100.

Furthermore, when displaying the intake calories (EAT), the intake calories can be displayed according to the recommended daily allowance, displayed based on each meal, or displayed in cumulative values for specific week/month by setting a predetermined period. Alternatively, as illustrated in FIG. 4, the intake calories can be displayed as an average value of the intake calories for a week (7 Days Avg).

At this time, the intake calories represent the calories from all ingredients including calories, such as carbohydrates, protein, fat, and alcohol. The intake calories can be calculated depending on the type and quantity of food included in the image or can be input by the user via the user interface 140.

The electronic apparatus can display also evaluations for the intake calories and the consumption calories, can display also the results of the consumption calories compared with the recommended daily allowance, thereby enabling the user to check the user's meal status for a specific period.

In an embodiment, the display unit 150 can display the nutrients contained in the identified food in parallel in a graph.

The display unit 150 can display multiple nutrients contained in the identified food. When a nutrient is input through the user interface 140, the display unit 150 can display sub-nutrients of the nutrients in a graph. When a sub-nutrient is input through the user interface 140, the display unit 150 can display an image including the food containing the sub-nutrient.

In an embodiment, higher-level nutrients can be displayed on a primary classification screen, and upon touching each graph on the primary classification screen, subordinate nutrients of the touched nutrient can be displayed on a secondary classification screen.

Figure 5:
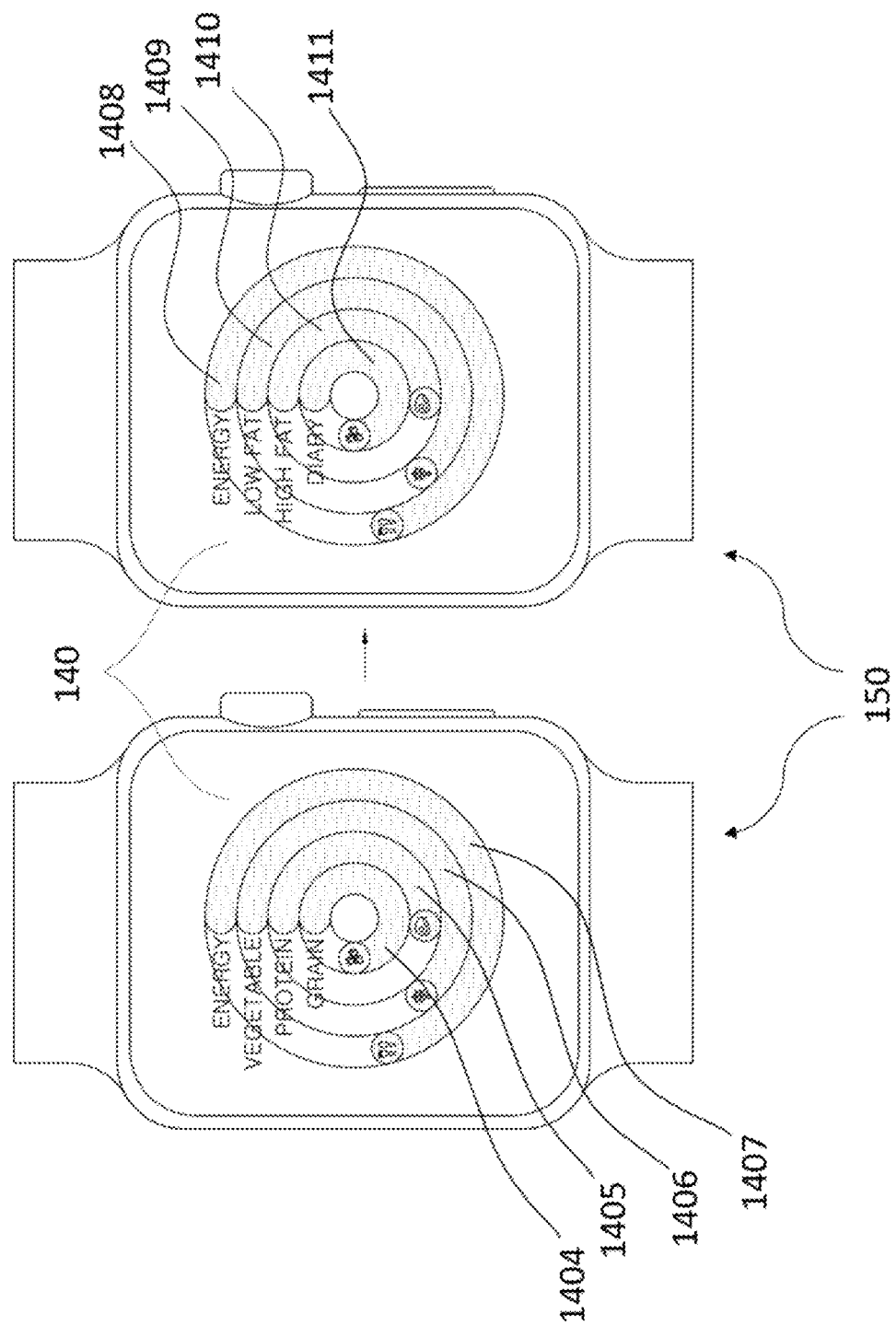
FIG. 5 is a view of a display unit of an electronic apparatus providing nutrition information according to an embodiment of the present disclosure.

As illustrated in FIG. 5, the display unit 150, on the user interface 104, can graphs 1404, 1408 of display nutrients (ENERGY), and display higher-level nutrients, for example, VEGETABLE graph 1405, PROTEIN graph 1406, and GRAIN graph 1407, on the primary classification screen. Upon touching PROTEIN graph 1406 on the primary classification screen, the display unit 150 can display subordinate nutrients of the touched nutrient, for instance, LOW FAT graph 1409, HIGH FAT graph 1410, or DAIRY graph 1411, on the secondary classification screen.

Additionally, upon touching each area on the secondary classification screen, the display unit 150 can display an image including the food containing the corresponding nutrients. As illustrated in FIG. 5, when a food icon corresponding to each nutrient is selected, the display unit 150 can display images including the food or a saved list of foods. The provided images may be the images automatically searched by the crawling unit 110.

Additionally, the nutrients displayed on the display unit 150 may be directly set by the user or may be preferentially displayed superordinate ingredients among the nutrients the most included in the list of the automatically searched foods.

Information on the food can be displayed in matching with the included nutrients, and nutrition information, such as dietary fiber, alcohol, and sugars in addition to the basic three nutrients generating calories, such as carbohydrates, protein, and fat, can be displayed. Thereamong, nutrients with a daily recommended allowance can be prioritized for display.

The display unit 150 can display nutrients in a visualized manner, such as a circular shape, a bar shape, or the like, and can display numerical values together with charts.

As illustrated in FIG. 5, when the user selects a specific nutrient, the display unit 150 can display detailed nutritional information of the corresponding nutrient, and display a food group including the nutrient. Since the display unit 150 displays information by food groups, the user can check which foods the user takes.

Meanwhile, in an embodiment, as illustrated in FIGS. 4 and 5, the user interface 140 and the display unit 150 can be implemented in the same region on a touch screen.

Figure 6:
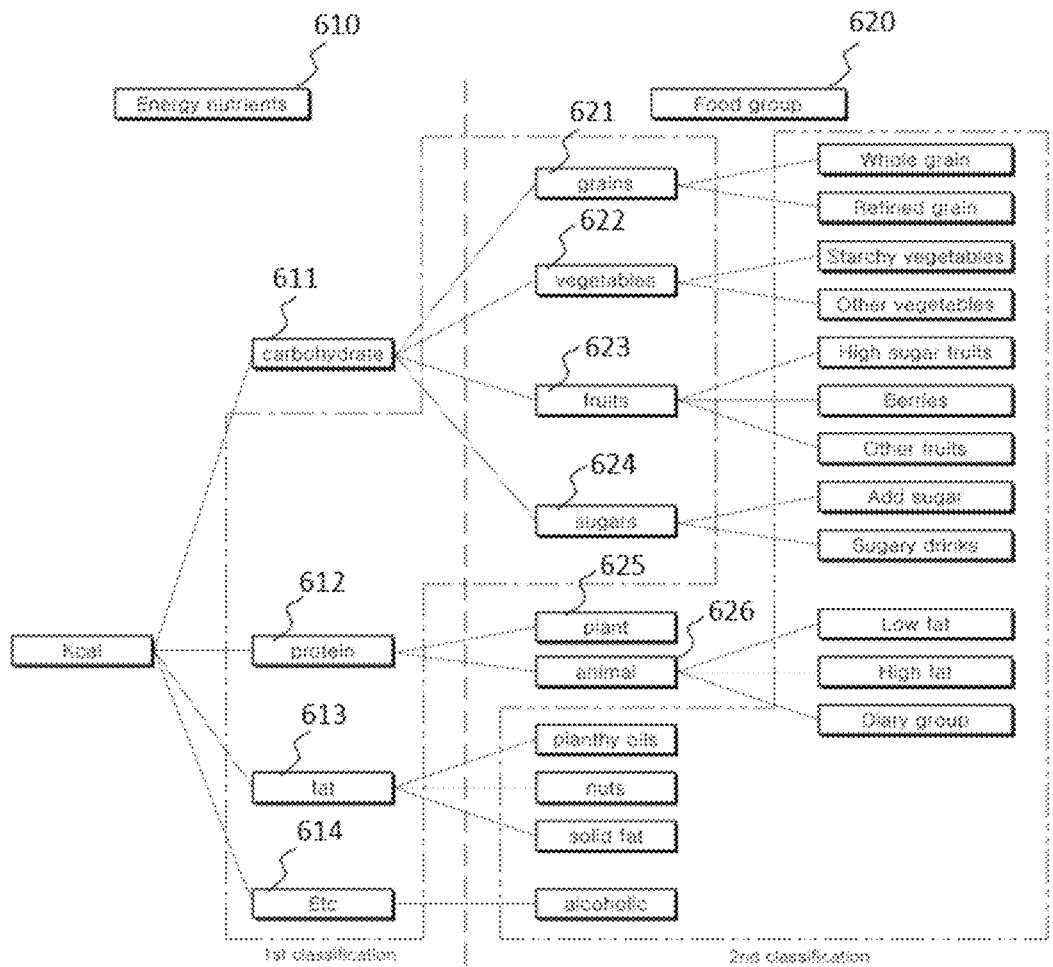
FIG. 6 is a categorization diagram of a hierarchical relationship of nutrients of an electronic apparatus providing nutrition information according to an embodiment of the present disclosure.

Additionally, as illustrated in FIG. 6, foods can be classified into energy nutrients 610, such as carbohydrates 611, protein 612, fat 613, and other nutrients (ETC) 614. The subordinate nutrients (food group) 620 corresponding to each nutrient can be classified into grains 621, vegetables 622, fruits 623, and sugars 624 which can contain carbohydrates, and can be classified into plant 625, and animal 626 which can contain protein. In other words, the subordinate nutrients represent more detailed nutrition information by reflecting the food groups, and the food groups corresponding to the nutrients can be expanded into five groups, twelve groups, and so on depending on the user's selection.

The food groups have a hierarchical relationship. Accordingly, when the user selects a specific group, the user can check detailed information about the corresponding group.

Therefore, the electronic apparatus 100 according to the present disclosure may include: the crawling unit 110 searching for and acquiring images including food; the target identifying unit 120 identifying food matching the acquired image; and the display unit 150 displaying the intake calories calculated according to types and quantity of the identified food and the received consumption calories in a ring-shaped graph.

Moreover, the display unit 150 can display the ring-shaped graph with lengths corresponding to values of the received consumption calories and the intake calories, and additionally display a parameter with a greater value between the consumption calories and the intake calories, and a difference value of a difference between the consumption calories and the intake calories.

Moreover, the display unit 150 can display multiple nutrients contained in the identified food in parallel in a ring-shaped graph. When any nutrient is input through the user interface, the display unit can display the subordinate nutrients of the nutrient in parallel in the ring-shaped graph. When any subordinate nutrient is input through the user interface 140, the display unit can display images including food containing the subordinate nutrient.

In an embodiment, the electronic apparatus 100 according to the present disclosure may include the processor 130 controlling the operation of the crawling unit 110 and the target identifying unit 120 to acquire the images including food for analyzing nutrition information before the nutrition information is displayed.

In an embodiment, the processor 130 according to the present disclosure can classify and search for images including the food according to the crawling level from images stored in a predetermined area and can perform vision processing to the automatically searched images including the target to identify the target. The images imaged during the same time zone with respect to the automatically searched food may be deleted, except for one image.

In other words, based on auto-crawling using the artificial intelligence model, the processor 130 can automatically search for and input images including food.

In another embodiment, the processor can perform vision processing of the selected image or an additionally captured image in accordance with commands received from the user interface 140 to identify the food included in the image, and transmit the target included in the image and information on the target or store them in the memory.

In other words, the processor can perform vision processing of the image selected from the automatically searched image list by the user, the image selected from the pre-stored image list, or the image additionally imaged in real time to identify the food.

Therefore, the present disclosure can perform image search by combining the automatic search and the manual search. Contents duplicated with the above-mentioned contents will be omitted for the sake of clarity in the description.

Therefore, the electronic apparatus 100 according to the present disclosure can reduce the inconvenience of having to input each food item when the user records evaluation on the eating habits or records the user's daily meal, and reduce the inconvenience of having to take pictures using a specific application. Accordingly, the user can easily input a meal by utilizing food images stored in various storage devices as well as smartphones, and receive evaluations on the user's eating habits by utilizing food images previously stored.

Furthermore, the electronic apparatus according to the present disclosure can provide nutrient evaluation results to the user not in a quantified manner but in a visualized manner, thereby allowing for easier understanding than the quantified manner. In addition, the electronic apparatus according to the present disclosure can display not only the information on the basic carbohydrates, protein, and fat but also information on food groups in a graph, so that the user can understand which food the user has to take. Furthermore, the electronic apparatus according to the present disclosure can provide additional detailed information so that the user can utilize desired information properly.

Figure 7:
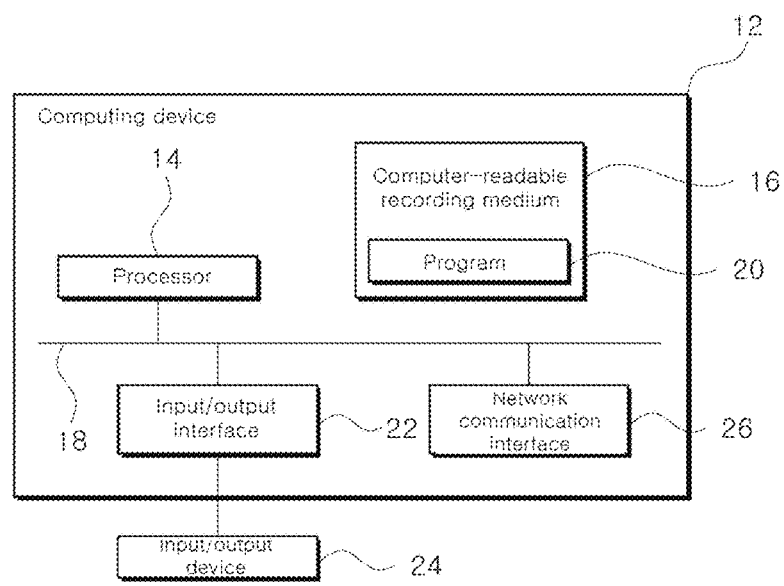
FIG. 7 is a view illustrating a computing device according to an embodiment of the present disclosure.

Additionally, as illustrated in FIG. 7, the electronic apparatus 100 according to the present disclosure may be implemented in the form of a recording medium storing computer-executable commands. The commands can be stored in the form of program code, and when executed by the processor, the electronic apparatus 100 can generate program modules to perform the operations of the disclosed embodiments. The recording medium can be implemented as a computer-readable recording medium.

The electronic apparatus 100 according to the present disclosure may correspond to the computing device 12, and the computing device 12 may include at least one processor 14, a computer-readable storage medium 16 including a program 20, and a communication bus 18. Furthermore, the computing device 12 may include one or more input/output interfaces 22 providing an interface for input/output devices 24 and one or more network communication interfaces 26.

The crawling unit 110, the target identifying unit 120, and the processor 130 of the present disclosure are units distinguished by functions, and can correspond to the processor 14. In addition, the user interface 140 and the display unit 150 of the present disclosure can correspond to one or more input/output interfaces 22 providing interfaces for the input/output devices 24. Therefore, each component of the electronic apparatus 100 according to the present disclosure may be all included in the single computing device 12 or may be implemented as separate devices.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

Advantageous Effects

The electronic apparatus according to the present disclosure can search for and input images simultaneously by auto-crawling without separately imaging a target or inputting targets one by one, so that a user can easily receive evaluations on the user's eating habits.

Moreover, the electronic apparatus according to the present disclosure can automatically crawl not only images imaged in real time or images stored in a limited area but also images previously stored or stored in other areas, thereby improving user convenience.

In addition, the electronic apparatus according to the present disclosure can provide various kinds of nutrition information that the user needs by using a visualized manner such as a graph to intuitively display food information corresponding to the nutrition information, thereby improving user convenience.

The advantages of the present disclosure are not limited to the above-mentioned advantages, and other advantages, which are not specifically mentioned herein, will be clearly understood by those skilled in the art from the following description.

The invention claimed is:

1. An electronic apparatus, which performs auto-crawling based on artificial intelligence, comprising:
  a crawling unit acquiring images including a food, using an artificial intelligence model;
  a target identifying unit identifying a food matching the acquired image;
  a user interface detecting an input from a user;
  a processor controlling operations of the crawling unit and the target identifying unit,
  wherein the processor is configured to:
    select a particular crawling level among a plurality of crawling levels, by analyzing images captured by a user, wherein the plurality of crawling levels include:
      a first crawling level searching for first images, in which the food is shown but a body portion and a face of a person are not shown;
      a second crawling level searching for the first images, and also searching second images, in which both the food and the body portion of the person are shown but the face of the person is not shown; and
      a third crawling level searching for the first images, the second images, and third images, in which all of the food, and the body portion and the face of the person are shown;
    automatically classify and search for all images including the food among a plurality of images stored in a predetermined area, according to the selected crawling level even if there is no user input for an image selection;
    perform vision processing of the automatically searched images including the food to identify the food; and
    transmit the automatically searched images including the food, along with food information generated by the vision procession, to a server, or store the automatically searched images including the food, along with food information generated by the vision procession, in a memory, and wherein the processor is further configured to automatically update the automatically searched images including the food, and the food information generated by the vision procession, in response to: recognizing an addition of new images to the predetermined area; receiving an image auto-search command from the user interface; or reaching a predetermined cycle, and wherein the processor is further configured to compare the images, and does not delete the images when the images include different foods and save the plurality of images, and the processor is further configured to compare the images, and when types of the food included in the images are the same, input and save only one image; and a display unit configured to
display a graph showing bars having lengths corresponding to values of consumption calories and intake calories, and additionally displays a parameter with a greater value between the consumption calories and the intake calories, and a difference value of a difference between the consumption calories and the intake calories, wherein the processor is configured to calculate the intake calories based on the type and quantity of the food included in the image, and also based on user information including activity metabolism that is measured by using a sensor of the electronic apparatus.

2. The electronic apparatus according to claim 1, wherein the processor is configured to receive a command from the user interface, and transmit a selected image or an additionally captured image among the automatically searched images to the server or store the selected image or the additionally captured image in the memory according to the received command.

3. The electronic apparatus according to claim 1, wherein the predetermined area includes a memory in the electronic apparatus, a cloud server, or a web page.

4. The electronic apparatus according to claim 1, wherein the artificial intelligence model performs machine learning for each image classified according to each crawling level, and the processor is configured to automatically classify and search for all images including the food among the plurality of images stored in a predetermined area, according to the selected crawling level, by using the artificial intelligence model.

5. The electronic apparatus according to claim 4, wherein the processor is configured to: classify the automatically searched images according to time zones;
and transmit only one image, among the images imaged during the time zone within a predetermined range, to the server or store the only one image in the memory, and deletes the remaining images.

6. The electronic apparatus according to claim 1, wherein the display unit is further configured to display nutrients contained in an identified food in parallel in a graph,
display a plurality of nutrients contained in the identified food, and
when any nutrient is input through the user interface, display subordinate nutrients of the nutrient in parallel in the graph, and
wherein when any subordinate nutrient is input through the user interface, the display unit displays images including food containing the subordinate nutrient.

* * * * *